Dec. 24, 1957  E. T. OAKES  2,817,306
SANDWICH MACHINE
Filed June 30, 1954  3 Sheets-Sheet 1
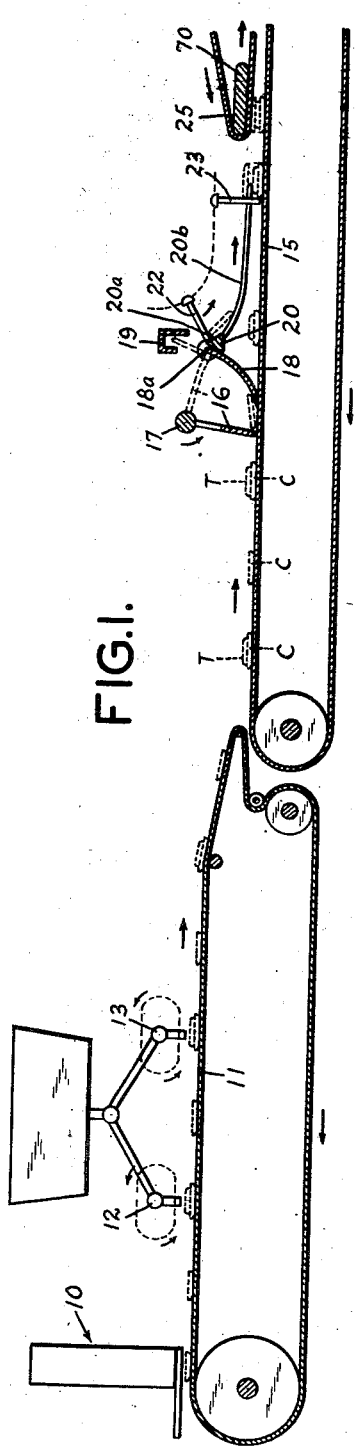
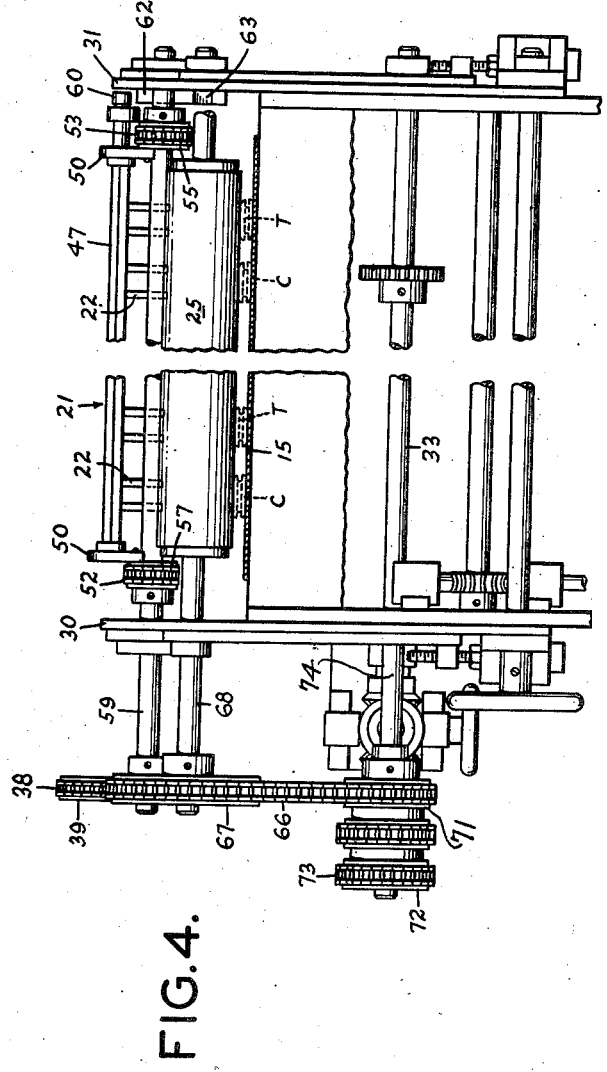
INVENTOR.
EARLE T. OAKES
BY
HIS ATTORNEYS.

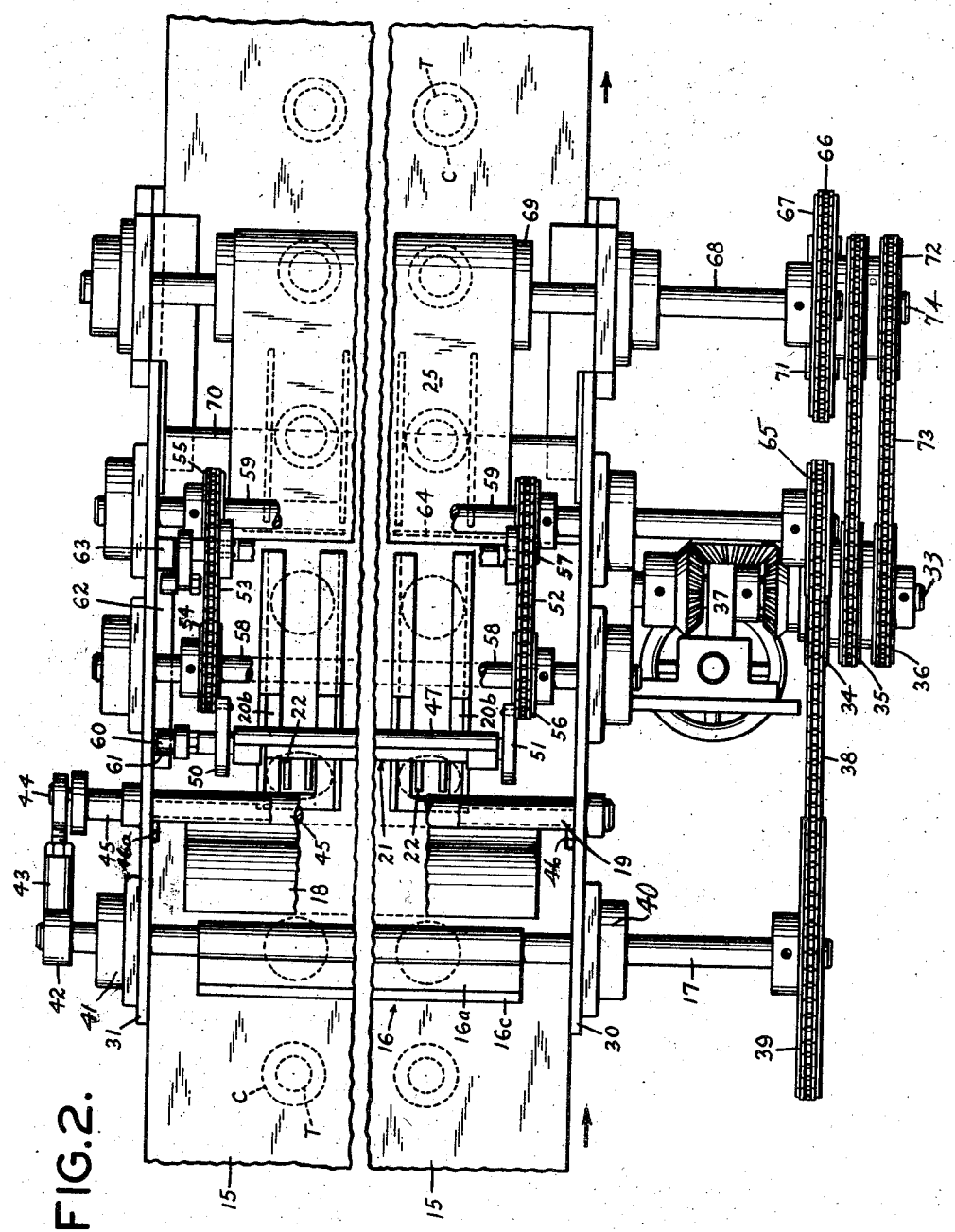

Dec. 24, 1957   E. T. OAKES   2,817,306
SANDWICH MACHINE
Filed June 30, 1954   3 Sheets-Sheet 3

INVENTOR.
EARLE T. OAKES
BY
HIS ATTORNEYS.

United States Patent Office 2,817,306
Patented Dec. 24, 1957

2,817,306

SANDWICH MACHINE

Earle T. Oakes, East Islip, N. Y., assignor to The E. T. Oakes Corporation, Islip, N. Y., a corporation of New York Application June 30, 1954, Serial No. 440,409

15 Claims. (Cl. 107—1)

This invention relates to improvements in sandwich-making machines and it relates particularly to improvements in machines for making sandwich-type cookies, cakes or confections of the type having a cream, marshmallow, jelly or similar filling.

The machines commonly used for making cookie-sandwiches include a battery or magazine of hoppers into which cookies are introduced and from which they are discharged in rows extending across a conveyor. The conveyor advances the cookies beneath a depositing device where filling or icing is deposited on the cookies. The coated or iced cookies then pass beneath another magazine where the cover or top cookies are discharged on top of the iced cookies to form the completed article.

Machines of the type described above are not as satisfactory as might be desired, especially for use in conjunction with a continuously operating baking oven. In order to keep the sandwich-making machine in operation, it is necessary for the operator of the machine to keep a supply of cookies in the magazine at all times. No particular problem is involved in keeping the magazine adjacent the baking oven full. However, the second magazine is difficult to fill because the cookies must be carried down to the second magazine and the operator must reach across the conveyor to fill the inner hoppers of the magazine. The wider the conveyor belt, the more difficult this operation becomes. At high production rates, one operator cannot keep the magazines full, so that frequent shutdowns are required. If individual hoppers of the magazines become empty, skips occur in the feed, the conveyor is smeared with icing or the sandwiches may be only partially completed, thereby interrupting the production cycle and causing operating losses.

The present invention overcomes the disadvantages of the prior sandwich-making machines by providing a device in which only one magazine of hoppers is required to feed the depositing and sandwich-making machine, the machine being constructed and arranged to deposit icing or the like on alternate edible articles or rows of articles such as cookies and to pick up and place the uniced articles on adjacent iced articles to form the completed sandwiches.

More particularly, the new sandwich-making machine can be arranged so that it operates in conjunction with a depositor so that only every other one of the cookies in a longitudinal row is provided with icing or topping. The uncoated cookies can then be picked up by the sandwich-making device, inverted and placed on top of the following iced cookie and pressed thereagainst to produce the completed sandwich.

If desired, the depositor may be operated to produce separate longitudinal rows of iced and uniced cookies or the like, the uniced cookies being picked up by the inverting device and moved into a position overlying the iced cookies and then applied thereto.

The new machine does away with the need for a separate magazine for the cover cookies and enables the depositor and the sandwich-making device to be inserted or used in a continuous production line with the cookie baking oven and the filling and packaging machines.

For a better understanding of the present invention, reference may be had to the accompanying drawing, in which:

Fig. 1 is a schematic illustration of a typical apparatus for manufacturing cookie sandwiches, in accordance with the present invention;

Fig. 2 is a plan view of the mechanism for inverting and assembling the cookies to form a sandwich, parts of the mechanism being shown in section and other parts being omitted to clarify the disclosure;

Fig. 4 is an end view of the machine with parts removed to disclose the drive mechanism therefor.

Figure 3:
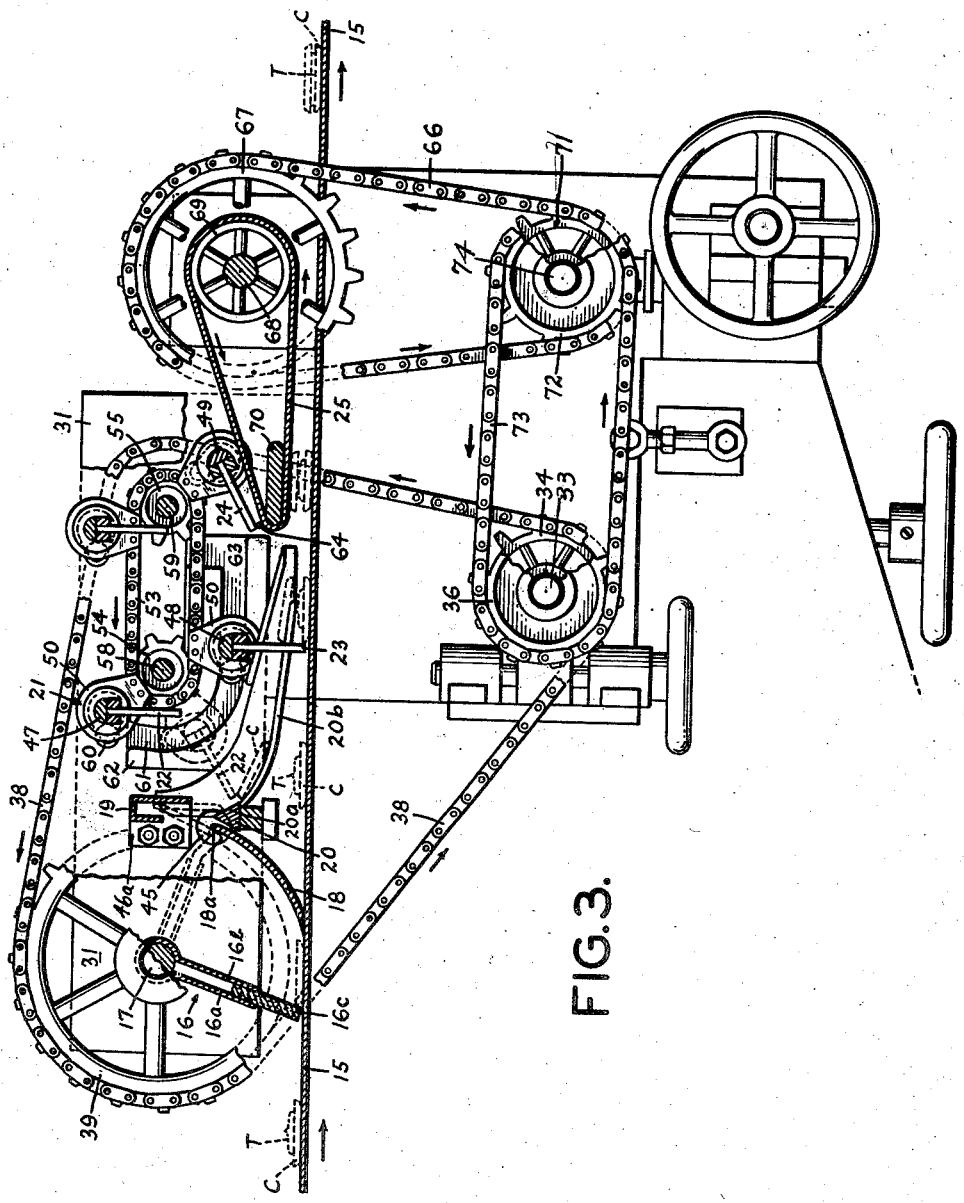
Fig. 3 is a view in side elevation and partly broken away, of the machine shown in Fig. 2.

The device for inverting and assembling the cookies to produce sandwiches in accordance with the present invention may be used in conjunction with a suitable depositing apparatus, such as, for example, the depositing apparatus disclosed in my co-pending application Serial No. 211,961, filed February 20, 1951, and now U. S. Patent No. 2,664,055, dated December 29, 1953. The depositing machine disclosed in my application, includes a battery or magazine including a plurality of similar hoppers 10 which supply cookies C in rows extending transversely of a continuously moving conveyor belt 11. In the normal operation of the depositing device, the rows of cookies are conveyed beneath one or more depositing heads 12 and 13 which move in orbital paths to apply icing to the tops of the cakes. The cakes are then carried to the end of the machine and discharged.

In accordance with the present invention, the mechanism for discharging the cookies from the hoppers 10 is arranged to operate at such speed relative to the depositing heads 12 and 13 that only alternate, transverse rows of the cookies C receive topping or icing T, as shown in Fig. 1.

The rows of iced and uniced cookies are delivered by means of a conveyor 15 disposed at the end of or forming a continuation of the conveyor 11, past a sweep or pick-up member 16 which is mounted on a shaft 17 disposed above the conveyor 15. The sweep or pick-up member 16 engages a row of uniced cookies and pushes them quickly up an inclined or curved ramp 18 until they clear the upper edge 18a of the ramp and their upper ends engage in an inverted J-shaped channel 19 disposed above and slightly behind the upper edge 18a of the ramp.

As the sweep or pusher forces the cookies up against the back of the channel member 19, their lower edges are displaced behind the edge 18a of the ramp so that when the cookies drop they will engage an inclined surface 20 on a wedge shaped bar 20a behind the ramp edge 18a and will be turned over and directed generally in the same direction as the direction of movement of the conveyor 15. The bar 20 has rearwardly extending downwardly inclined support rods 20b like the tines of a fork to support the inverted cookies as they move to the right as viewed in Fig. 1.

The ramp 18 is arranged to rock up and down so that it is disposed in the path of the uniced cookies but is lifted to allow the iced cookies to pass under it.

In order to assure alignment of the inverted uniced cookies with the iced cookies, a feed device 21 is provided which includes a plurality of sets of cam controlled pusher fingers 22, 23, 24, etc., which move in the same direction and at a slightly higher speed than the conveyor 15. Thus, as shown in Fig. 1, the fingers 22 and 23 engage behind uniced, inverted cookies and pass between the support rods 20b and advance the cookies in the direction of movement of the conveyor belt 15. The fingers 23, in the position shown, engage the back edge of the iced cookie on the conveyor 15 so that the top and bottom cookies are fed together in the direction of movement of the conveyor 15. The fingers 23, etc. and the conveyor 15 advance the cookies and discharge the upper cookies off the ends of the rods 20b into contact with the icing T on the lower cookies and they then pass beneath a presser belt 25 which is spaced from the upper surface of the conveyor 15 but is inclined toward it to squeeze the top and bottom cookies together and thereby distribute the icing between them.

As each row of assembled sandwiches is fed beneath the belt 25, the corresponding set of fingers, such as the fingers 24, are released to enable them to swing back and past the end of the conveyor belt 25 without damage to the fingers or the cookies advanced thereby.

Having explained the general principles of operation of the device, reference will now be had to Figs. 2 to 4, in which the details of the cookie inverting mechanism are disclosed. The mechanism includes a pair of side plates or frame members 30 and 31 which may be mounted on a suitable base or table and supported on opposite sides of the conveyor 15 or formed as a part of or attached to the frame of the depositor, as may be desired. Extending transversely between the frame plates 30 and 31, as best shown in Fig. 4, is the main drive shaft 33 of the device which carries a sprocket 33a that may be connected to a suitable source of power such as the motor for driving the depositor. The shaft 33 carries on its outer end a set of three sprockets 34, 35 and 36 which may be used to time the speed of the machine in conjunction with a variable speed mechanism 37.

The sprocket 34 is connected by means of a chain 38 to a sprocket 39 which is mounted on the end of the sweep or pick-up shaft 17, the shaft being supported in suitable bearings 40 and 41 on the side plates 30 and 31, respectively. The sweep or pick-up member 16, as shown, may consist of a sheet metal member bent around the shaft to provide spaced apart flanges 16a and 16b between which is mounted a strip of flexible rubber 16c. It will be evident that as the shaft 33 is driven, the sweep shaft 17 will be rotated in a counterclockwise direction to push the uniced cookies up the ramp 18 and invert them.

One end of the shaft 17 is provided with an eccentric and eccentric strap 42 which is connected by means of a connecting rod 43 to a crank pin 44 on the end of a transverse shaft 45. The shaft 45 is mounted for rotation at its opposite ends in the side plates 30 and 31 and carries the ramp member 18. The relation between the eccentric 42 and the crank pin 44 is such that the ramp member 18 is given an oscillatory movement between a lower position substantially in engagement with the conveyor belt 15 and an upper position sufficiently high to enable the iced cookies to pass between it.

The channel member 19 by means of which the cookies are inverted is mounted on end plates 46 and 46a which are also secured to the side plates 30 and 31 of the machine.

The cross bar 20 likewise is mounted at its ends on the side frames 30 and 31 below the shaft 45.

The pick-up fingers 22, 23, 24, etc., as best shown in Figs. 1 and 3, preferably are mounted in pairs on transversely extending shafts 47, 48 and 49, etc., which are supported rigidly in generally lobe-shaped end plates 50 and 51 at their opposite ends. The ends of the end plates 50 and 51 are connected to the inner sides of chains 52 and 53 which pass over the sprockets 54, 55 and 56, 57 at the opposite ends of the cross-shafts 58 and 59. The cross-shafts are journaled in suitable bearings in the side frames 30 and 31.

Each of the lobe-shaped end plates 50, as shown in Fig. 3, is provided with a laterally extending cam follower member 60 which engages in a partially closed cam track 61 formed in a cam block 62 carried by the plate 31. The cam track 61 extends only around the left-hand end and the lower part of the orbital path of the chains 52 and 53. The cam follower 60, as best shown in Fig. 2, is offset from the axis of its corresponding shaft 48, for example, so that a crank action is obtained to hold the fingers 23 substantially radially during the movement of the cam follower 60 along the track 61. However, at the right-hand end of the cam track 61, as shown in Fig. 3, a relief space 63 is provided which releases the cam follower to allow it to tilt clockwise, thereby enabling the fingers to disengage from the cookies and to be deflected by a pin 64 out of contact with the belt 25. The shafts 58 and 59 are driven by means of the chain 38 which extends also around a sprocket 65 on the end of the shaft 59.

The presser belt 25 is also driven by means of a chain 66 passing around a sprocket 67 on the end of the shaft 68. The shaft 68 is rotatably mounted and adjustable up and down in the side plates 30 and 31. The shaft 68 carries the roller 69 around which the belt 25 extends. The left-hand end of the belt may pass around a smaller idler roller or a fixed nose piece 70 which also is carried by the frame plate and also may be adjusted up and down. The chain 66 is driven by means of a sprocket 71 and the latter is connected to a sprocket 72 which is connected by means of a chain 73 to the sprocket 36. The sprockets 71 and 72 are mounted on the shaft 74. In this way, all of the elements of the device for inverting the cakes and pressing the cakes together are driven in synchronism and in properly timed relation.

The device may, of course, be provided with suitable adjustments, by mechanism illustrated in the drawing but not described herein, for tensioning the chains and adjusting the positions of the several elements relative to each other and the conveyor belt 15. The adjusting mechanisms per se are conventional.

It will be seen from the preceding description that the magazine of hoppers 10 of the depositor can be loaded with cookies or cakes in a bottom-side-up position so that no particular skill or manual dexterity is required to remove the cookies from a baking oven conveyor and transfer them to the hoppers. The cookies are fed automatically from the magazine, alternate cookies are iced and the uniced cookies are then inverted and pressed against the iced cookies. There is no need for a second magazine, thereby relieving the operator of the difficult and time-consuming task of filling such a magazine.

It will be understood, of course, that the turnover device described may be used with many different kinds of depositors and that it may be used for making other products than cookie sandwiches. The machine may be made of appropriate size to handle cakes, or any other confection or the like in which a layer of material is to be disposed between two similar upper and lower articles, such as wafers, cakes, bread slices, or the like. Therefore, the form of the invention disclosed herein should be considered as illustrative and not as limiting the scope of the following claims.

I claim:

1. An apparatus for making sandwiches comprising hopper means to receive a plurality of articles from which sandwiches are to be made, means to discharge said articles successively from said hopper means, a conveyor to receive said articles from said hopper means in at least one row, means to deposit a sandwich filling on alternate articles in a row, the intermediate articles being free of filling, a member overlying said conveyor and movable toward and away from it to intercept said articles, means to synchronize the movement of said member with said discharging means to cause said member to intercept said intermediate articles only, means to push said intermediate articles over said member and invert them, and means to receive said inverted articles from said pushing and inverting means and guide them into superimposed relation to the articles having filling thereon.

2. An apparatus for making sandwiches comprising a conveyor to advance at least one row of articles extending lengthwise of said conveyor, alternate articles in said row having a sandwich filling thereon and the other articles being free of said filling, a deflecting member mounted above said conveyor and movable between a first position substantially in engagement therewith at one end and inclined with respect thereto, and a second position in which it is spaced from said conveyor to permit said articles to pass beneath it, means to move said member in timed relation to said conveyor to move it into said first position to intercept said other articles and to said second position to permit the articles having the filling thereon to pass beneath it, a movable pick-up member mounted above the conveyor and adjacent to said deflecting member, means to move said pick-up member in timed relation to said conveyor and deflecting member to push said other articles up said deflecting member, an inverted channel member adjacent the upper edge of said deflecting member to receive the articles pushed up the deflecting member and drop them behind the deflecting member in an inverted position, and means movable in timed relation to said conveyor to engage said inverted articles and move them into superimposed relation to articles having a filling thereon.

3. An apparatus for making sandwiches comprising a conveyor to advance at least one row of articles alternately having and not having a sandwich filling thereon, a deflecting member mounted above said conveyor and movable into and out of a position to intercept articles on said conveyor, means to move said deflecting member in timed relation to said conveyor to move it into said position to intercept the articles not having a filling thereon, means movable in timed relation to said conveyor to push the intercepted articles up the deflecting member, means above said deflecting member to be engaged by said articles and invert and direct them behind said deflecting member, and means to engage said inverted articles and move them into superimposed relation to said articles having a filling thereon.

4. The apparatus set forth in claim 3 in which the means to engage and invert said articles comprises a channel member of substantially inverted J-shaped cross-section positioned above and behind said deflecting member to engage said articles and position them behind said deflecting member, and a rearwardly inclined guide member behind the deflecting member and below the channel member.

5. The apparatus set forth in claim 3 in which the means to engage and invert said articles comprises a channel member of substantially inverted J-shaped cross-section positioned above and behind said deflecting member to engage said articles and position them behind said deflecting member, a rearwardly inclined guide member behind the deflecting member and below the channel member, and a plurality of spaced apart fingers on said guide member extending rearwardly therefrom and inclined downwardly toward said conveyor.

6. The apparatus set forth in claim 3 in which the means to push the articles up the deflecting member comprises a rotatable shaft above said conveyor and in front of said deflecting member, a sweeping blade extending substantially radially therefrom and substantially engageable with said conveyor and said deflecting member, and means to rotate said shaft to move said sweeping blade in the direction of movement of said articles and from the bottom to the top of said deflecting member.

7. The apparatus set forth in claim 3 in which the means to engage the inverted articles comprises a plurality of fingers, and means to move said fingers in an orbital path to engage and advance said articles.

8. The apparatus set forth in claim 3 in which the means to engage the inverted articles comprises a chain, a pair of sprockets supporting said chain in spaced relation to said conveyor, means to rotate said sprockets to move the lower flight of said chain in substantially the same direction as said articles on said conveyor, a plurality of pusher members rockably mounted on said chain in spaced relation along its length, and means to hold said pusher members substantially perpendicular to said chain during their movement toward and with said conveyor and to release said pusher members for rocking movement relative to said chain during movement away from and in a direction opposite to said articles on said conveyor.

9. An apparatus for making sandwiches comprising a magazine for receiving stacks of articles, a conveyor adjacent thereto, means to discharge said articles from said magazine in rows extending lengthwise of said conveyor, means for moving said conveyor to advance said rows of articles, a depositor, means operated in timed relation to movement of said conveyor for actuating said depositor to deposit a topping of sandwich filler on alternate articles in said rows on said conveyor, the articles in said rows between said alternate articles being free of said topping, means overlying said conveyor to pick up and turn over the articles which are free of said topping, and means to move the last-mentioned articles into position above articles having a topping thereon and place them on said topping.

10. An apparatus for making sandwiches comprising a magazine for receiving stacks of articles, a conveyor adjacent thereto, means to discharge said articles from said magazine in rows extending transversely of said conveyor, means for moving said conveyor to advance said rows of articles, a depositor, means operated in timed relation to the movement of said conveyor for actuating said depositor to deposit a topping of sandwich filler on the articles in alternate transverse rows on said conveyor, the articles of rows between said alternate rows being free of said topping, means overlying said conveyor to pick up and turn over the articles which are free of said topping, and means to move the last-mentioned articles into position above articles having a topping thereon while the latter are being advanced by said conveyor and place them on said topping.

11. An apparatus for making sandwiches comprising a hopper to receive a plurality of articles from which sandwiches are to be made, conveying means to receive said articles from said hopper, means to move said conveying means, means to discharge said articles successively from said hopper onto said conveying means to form a row of articles extending lengthwise of said conveying means, means to deposit a sandwich filling on alternate articles in said row, the intermediate articles being free of filling, means to pick up said intermediate articles from said conveying means and invert them, and means to guide the inverted articles into superimposed relation to said alternate articles and place the inverted articles on said alternate articles with the filling therebetween.

12. An apparatus for inverting and assembling articles to make sandwiches comprising conveying means to support a row of the articles extending lengthwise of said conveying means, a movable pickup member above said conveying means to engage and advance alternate articles in said row, an inclined member movable toward and away from said conveying means to intercept said alternate articles advanced by the pickup member and elevate them above said conveying means, means for moving said pickup member and said inclined member in timed relation to said conveying means to pick up and elevate said alternate articles, an inverting member in the path of said alternate articles to be engaged by said alternate articles to invert them, and guide means to return the inverted articles toward said conveying means in its direction of movement.

13. An apparatus for inverting and assembling articles to make sandwiches comprising conveying means to support a row of the articles extending lengthwise of said conveying means, a movable pickup member above said conveying means to engage and advance alternate articles in said row, an inclined member, means for moving said inclined member in timed relation to said conveying means to intercept said alternate articles on said conveying means and elevate them above said conveying means, an inverting member in the path of said articles to be engaged by said alternate articles and invert them, guide means to return said inverted alternate articles toward said conveying means in its direction of movement, and movable means having elements thereon to engage said inverted articles successively and place them on top of other articles on said conveying means.

14. An apparatus for making sandwiches comprising a row of hoppers to receive articles, movable conveying means adjacent to said hoppers, means for moving said conveying means, means to discharge articles from said hoppers onto said conveying means in rows extending transversely of said conveying means, means operated in timed relation to said discharge means to apply a topping of sandwich filler to alternate transverse rows of said articles so that the articles of one row have a topping of sandwich filler and the articles of an adjacent row are free of said topping, means operated in timed relation to said discharging means to pick up and turn over said adjacent row of articles, and means to move the last-mentioned articles on top of the articles having a topping thereon.

15. An apparatus for making sandwiches comprising hopper means to receive a plurality of articles from which sandwiches are to be made, movable conveying means adjacent to said hopper means, means for moving said conveying means relative to said hopper means, means to discharge said articles successively from said hopper means onto said conveying means in at least one row extending lengthwise of said conveying means, means operable in timed relation to said discharging means to deposit a sandwich topping on alternate articles in said row, intermediate articles being free of topping, means to pick up and turn over the articles which are free of said topping, and means to move the last-mentioned articles on top of said articles having a topping thereon while the latter are being advanced by said advancing means.

References Cited in the file of this patent

UNITED STATES PATENTS

| | | |
|---|---|---|
| 1,114,138 | Hitchner | Oct. 20, 1914 |
| 1,575,207 | Hungerford | Mar. 2, 1926 |
| 2,391,937 | Arvidson | Jan. 1, 1946 |
| 2,394,795 | Manspeaker | Feb. 12, 1946 |